United States Patent [19]

Maccaferri

[11] Patent Number: 4,834,308

[45] Date of Patent: May 30, 1989

[54] PROGRAMMABLE ROBOT OF THE WIRE-GUIDED OR RADIO-CONTROLLED TYPE, FOR LOADING AND UNLOADING AUTOMATICALLY EMPTY SPOOLS AND FILLED SPOOLS INTO AND FROM WIRE WINDING MACHINES

[75] Inventor: Angelo Maccaferri, Bologna, Italy

[73] Assignee: S.A.M.P. S.p.A. Meccanica di Precisione, Bologna, Italy

[21] Appl. No.: 147,185

[22] Filed: Jan. 22, 1988

[30] Foreign Application Priority Data

Jan. 23, 1987 [IT] Italy ................. 12407 A/87

[51] Int. Cl.⁴ .......................................... B65H 67/04
[52] U.S. Cl. .......................... 242/35.5 A; 242/25 R; 901/1
[58] Field of Search ............ 242/35.5 A, 35.5 R, 242/25 A, 25 R, 18 R, 18 A; 901/1; 57/268, 269, 270, 271

[56] References Cited

U.S. PATENT DOCUMENTS

| | | | |
|---|---|---|---|
| 4,007,882 | 2/1977 | Isoard | 242/35.5 A X |
| 4,427,158 | 1/1984 | Conrad | 242/35.5 A |
| 4,555,067 | 11/1985 | Angelucci et al. | 242/35.5 A |
| 4,591,106 | 5/1986 | Gay | 242/35.5 A X |
| 4,610,404 | 9/1985 | Maccaferri | 242/25 R |
| 4,615,493 | 10/1986 | Teranishi et al. | 242/35.5 A |
| 4,621,778 | 11/1986 | Paravella et al. | 242/35.5 A |
| 4,636,137 | 1/1987 | Lemelson | 901/1 X |
| 4,637,564 | 1/1987 | Hallenbeck et al. | 242/25 A |
| 4,655,258 | 4/1987 | Breyer et al. | 901/1 X |
| 4,679,152 | 7/1987 | Perdue | 901/1 X |
| 4,698,775 | 10/1987 | Koch et al. | 901/1 X |

Primary Examiner—Stanley N. Gilreath
Attorney, Agent, or Firm—Larson and Taylor

[57] ABSTRACT

This invention relates to a robot which serves automatically a plurality of machines for winding any kind of wire or yarn. This robot is mounted on a wire-guided and/or radio-controlled carriage; it can run on a normal floor and may serve the winding machines and the spool-supplying and collecting magazines, regardless of their relative positions. When co-operating with the winding machines, the robot-mounting carriage will move into the correct position with respect to the winding machine to be served, and then will stop. The removal of a filled spool and insertion of an empty spool are effected by slides which are associated with supporting brackets of said robot. The robot is provided with an electro-mechanical programmer which controls the lifting movement of the assembly of said brackets for adjusting their positions to the level of the lower side of the spools of different diameters in the winding machines. The programmer is associated with the bracket-carrying structure of the robot, which may be controlled to rotate about its vertical axis, whereby said rotation can occur with the brackets in their upper position, thus reducing the working time of the robot.

9 Claims, 13 Drawing Sheets

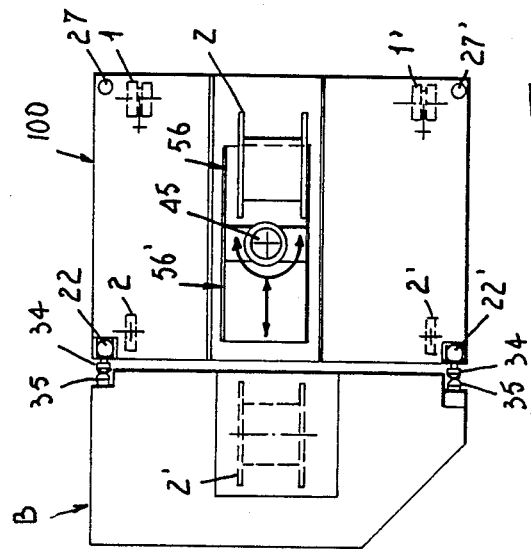
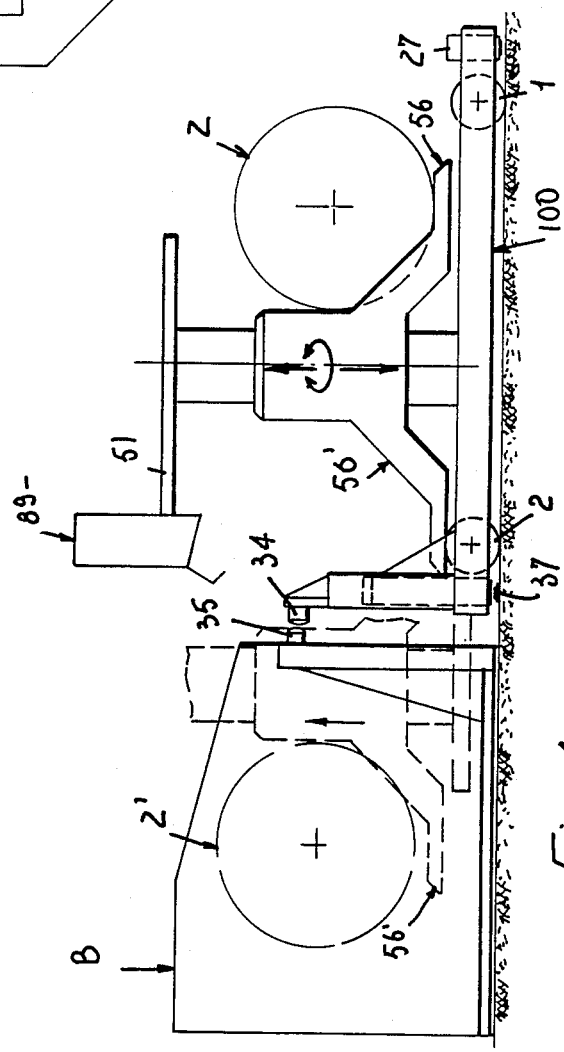

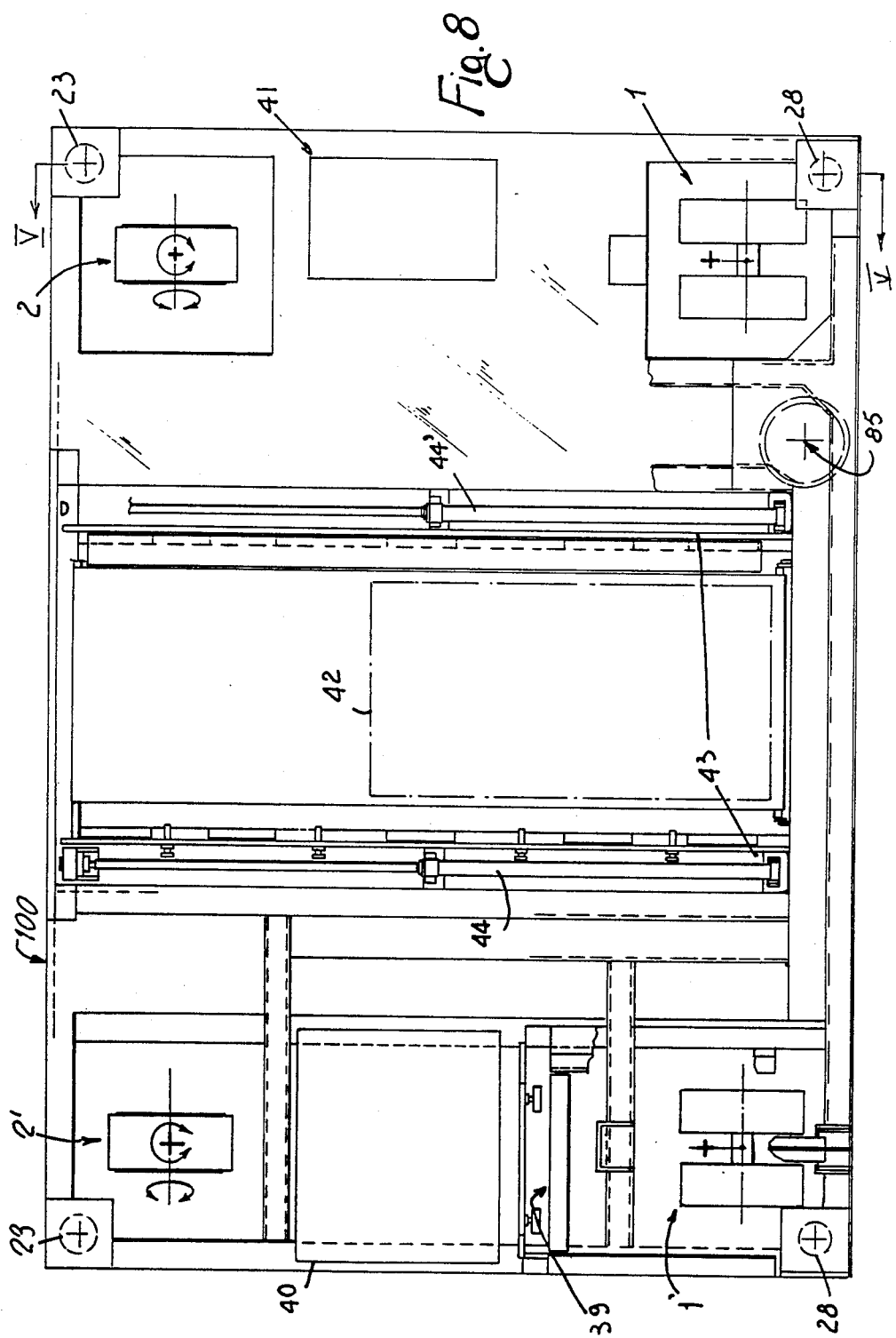

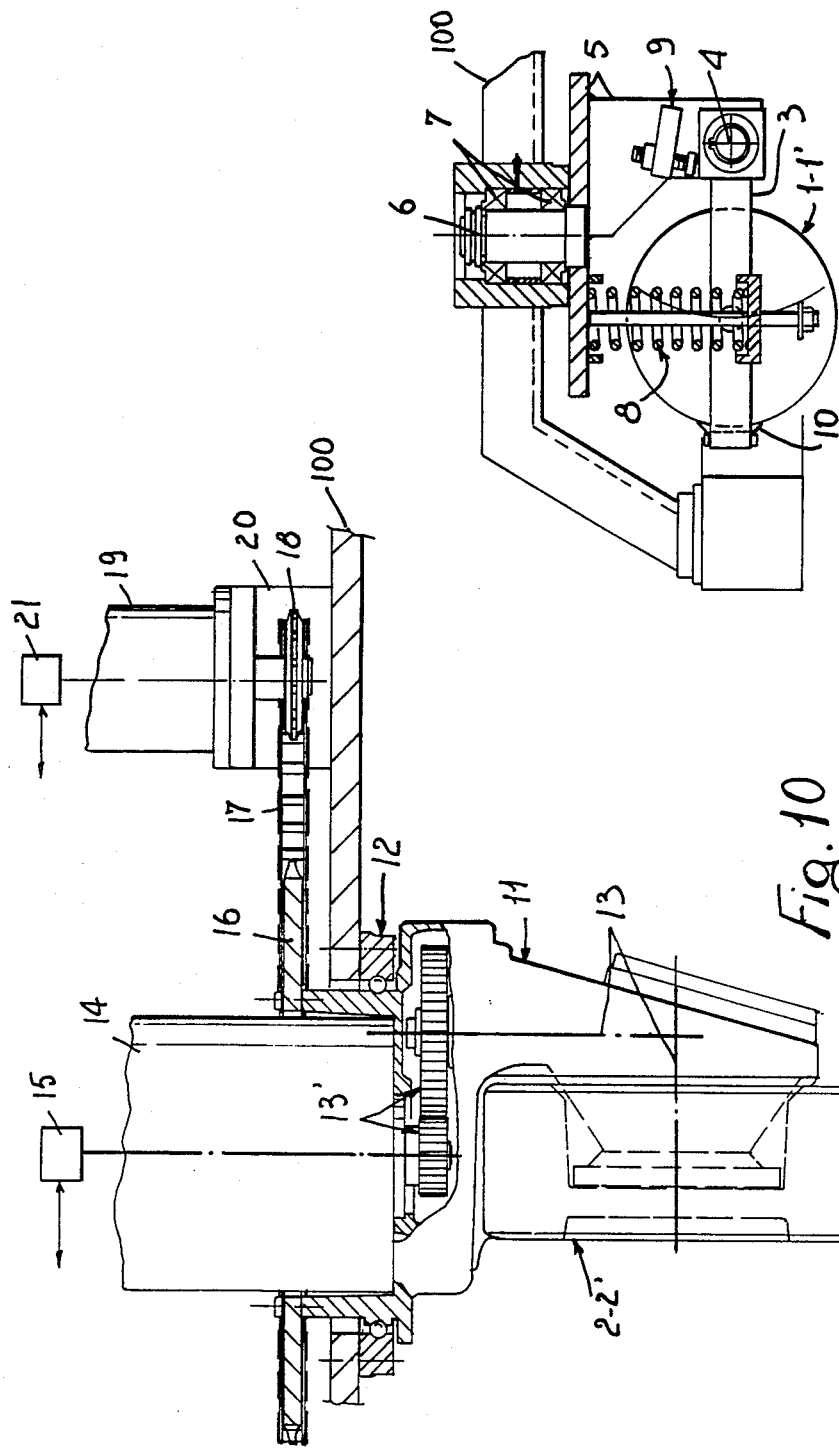

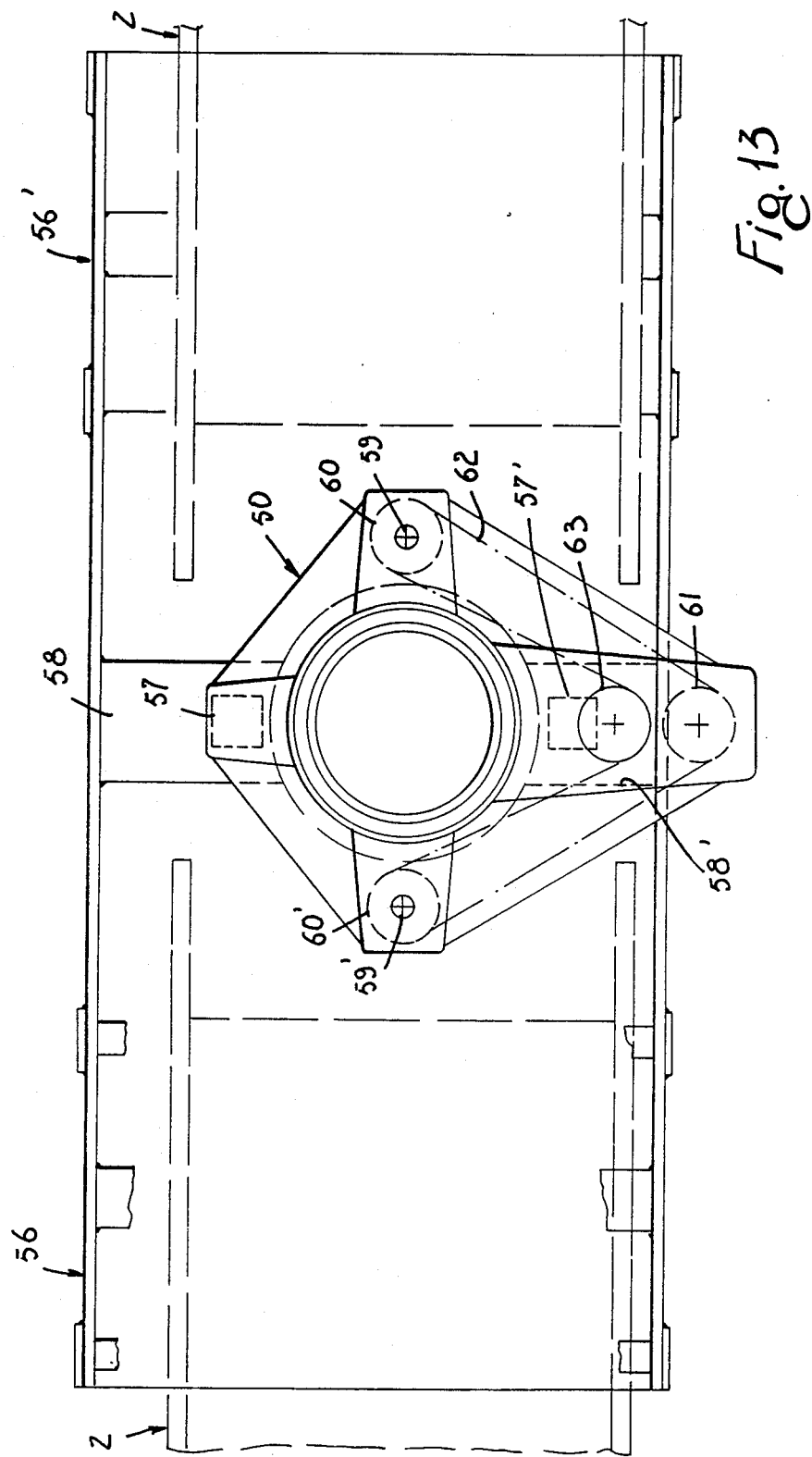

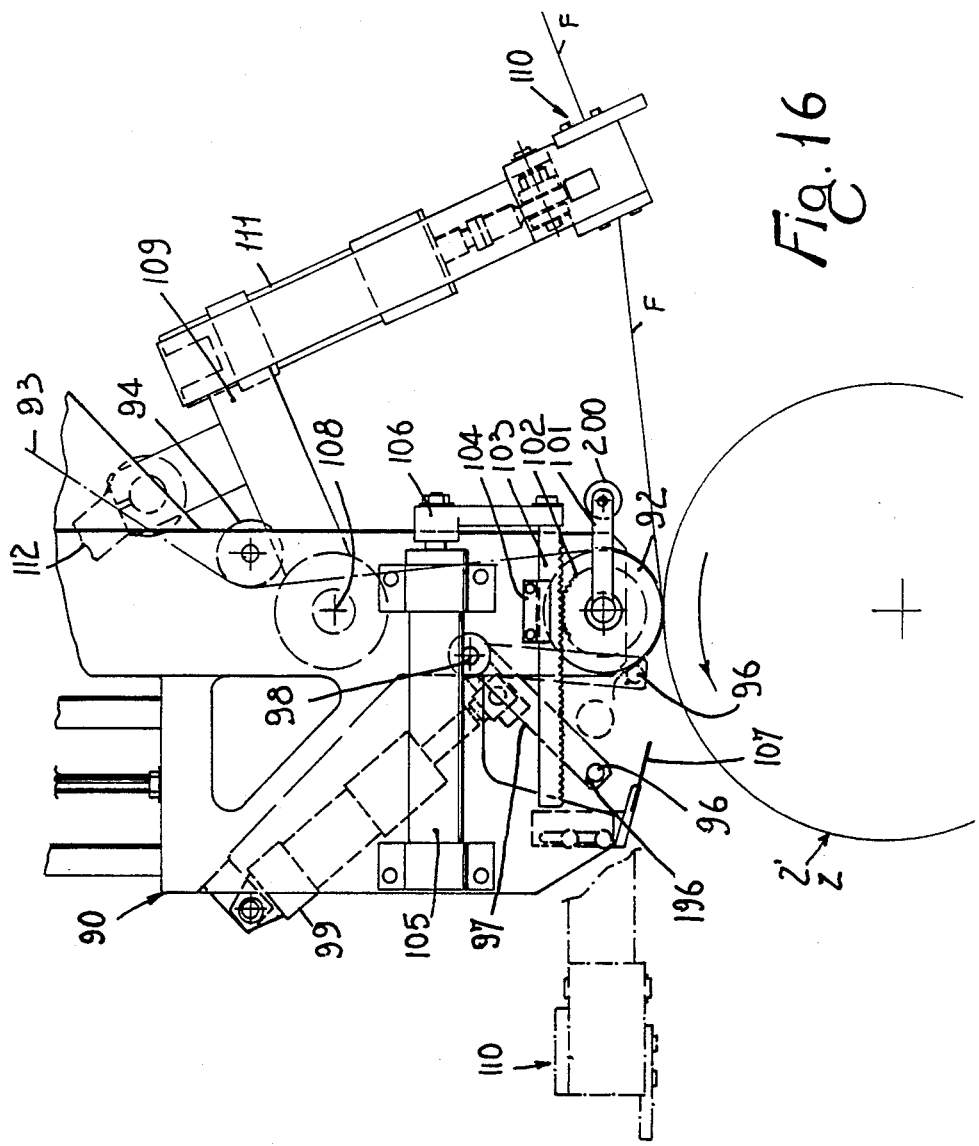

PROGRAMMABLE ROBOT OF THE WIRE-GUIDED OR RADIO-CONTROLLED TYPE, FOR LOADING AND UNLOADING AUTOMATICALLY EMPTY SPOOLS AND FILLED SPOOLS INTO AND FROM WIRE WINDING MACHINES

SUMMARY OF THE INVENTION

This invention relates to a programmable robot of the wire-guided and/or radio-controlled type, capable of loading and unloading automatically empty spools and filled spools, either of the same or of different diameters, into and from a plurality of winding machines arranged anyway, by withdrawing the empty spools and discharging the filled spools from and into respective supplying and collecting magazines which may be arranged anyway and anywhere with respect to each other and to the winding machines. The robot mounts the means for securing the trailing and the leading ends of the wire or yarn to a spool, so that the winding machines may be of conventional type. Moreover, the robot is capable of co-operating with spool-supplying and collecting magazines, both of the gravity and pallet types.

BRIEF DESCRIPTION OF THE DRAWINGS

The characteristics of the robot of the invention and the advantages resulting therefrom will be apparent from the following description of a preferred embodiment thereof, shown by way of a non-limiting example on the figures of the accompanying twelve sheets of drawings, wherein:

FIGS. 3 and 4 are diagrammatic top plan and side elevational views, respectively, of the robot while co-operating with a winding machine;

FIG. 8 is a top plan view of the robot-carrying carriage;

FIGS. 9 and 10 are side elevational and partly sectional views of one of the idle swivel wheels and one of the driving steering wheels, respectively, of the carriage of FIG. 8;

FIG. 11 is a sectional view, on the line XI—XI of FIG. 1 of the section of a robot, that is used to handle the spools;

FIG. 13 is a top plan view of the assembly of FIG. 11;

FIG. 16 is an elevational view of the unit for securing the leading end and the trailing end of a wire or yarn and for cutting and gripping said wire or yarn;

DESCRIPTION OF THE PREFERRED EMBODIMENTS

Figure 2:
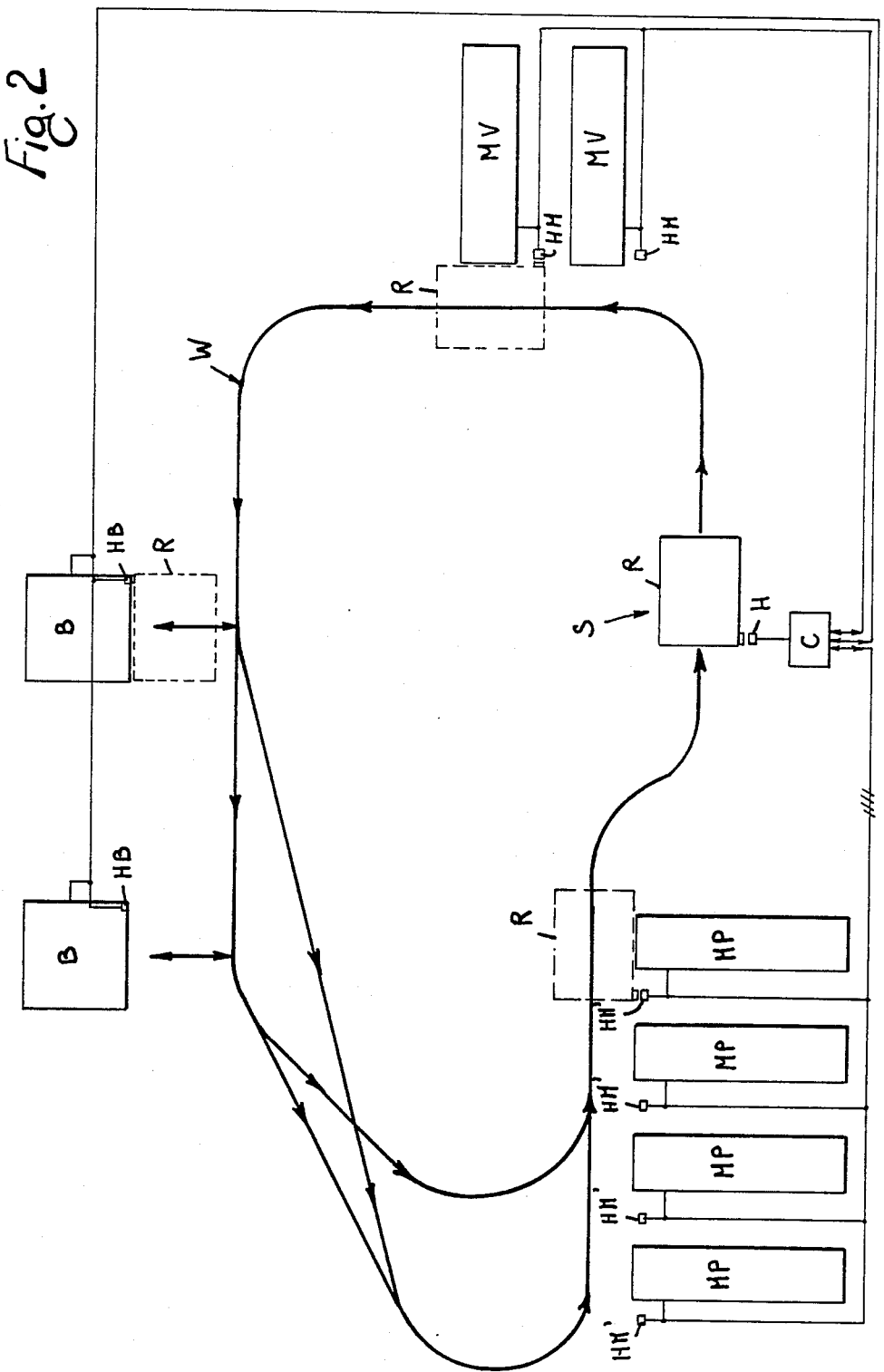
FIG. 2 is a diagrammatic top plan view of a possible configuration of a winding machine plant served by the robot according to the invention.
Figure 5:
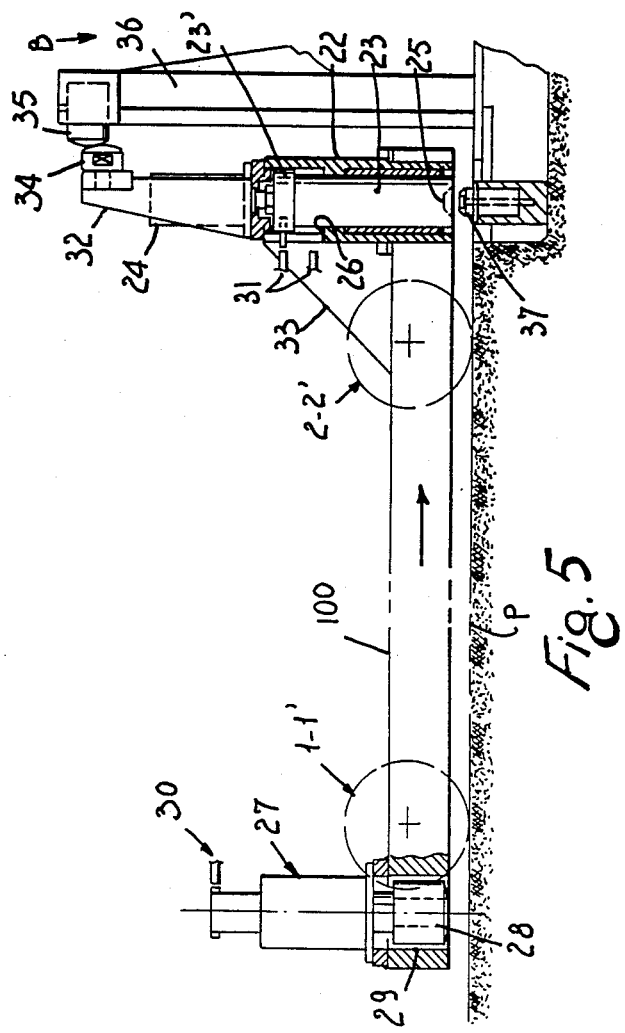
FIGS. 5, 6 and 7 are side elevational and partly sectional views showing the robot-carrying carriage during three steps of the positioning cycle with respect to a winding machine.

FIG. 2 shows a possible operating mode of the robot of the invention, mounted on a carriage running on tired wheels over a normal floor, and equipped with idle swivel wheels and driving steering wheels, the latter being controlled by an electronic apparatus following a path W made of a wire or a track of any other suitable material, suitably embedded in the floor. B indicates the winding machines, MV the magazines supplying the empty spools, MP the magazines collecting the filled spools picked up from said winding machines. It is to be understood that said magazines and winding machines may be arranged anyway and anywhere, since the carriage-robot of the invention has no limitation but a pre-established minimum turning radius.

The robot is usually at a standstill at a stand-by station S where, for example, through opto-electronic systems, it communicates with a terminal H which is connected to an electronic processor C receiving the operating information from the various magazines and winding machines, where there are arranged further terminals HM-Hb-Hm' capable of communicating with the robot when it becomes aligned with the units MV-B-MP.

When a winding machine reaches the final step of its winding cycle and slows down, or at any other desired moment, a call signal is emitted by suitable means associated with said winding machine and communicates to the robot R to which magazine it must transfer to withdraw an empty spool of the desired type and size. Upon reaching the selected one of the magazines MV, the robot communicates with the respective terminal HM and receives further information from the main computer to proceed on its operative cycle and to check the operative status of said robot for safety purposes. After removing the empty spool, the robot receives the signal to move to the winding machine B that requested said robot. The instructions and checks follow up each other until the robot has completed its operative cycle by discharging the filled spool removed from the winding machine into a pre-established one of the magazines MP and by finally moving back to the stand-by station S.

Also during its transfer movements to the various stations, the robot is self-controlled and can stop automatically in case of any trouble.

It is to be understood that radio-control systems may be used in lieu of the opto-electronic terminals, as may be readily perceived and carried out by those skilled in the art.

The robot mounts thereon, besides the means for handling either the empty and filled spools received from and discharged into the magazines MV-MP, the means for either introducing and removing the spools into and from a winding machine, and the means for cutting the wire or yarn and securing the leading and trailing ends thereof to a spool, so that it may be applied to conventional winding machines with no modification or addition to said machines.

The spools may be arranged in the magazines MV and MP either on gravity chutes or on pallets. In the latter instance, the carriage of the robot R comprises an operating boom capable of transferring the spools from the magazines to said robot, and vice versa, regardless of the orientation of the spools in said magazines.

the robot-carrying carriage mounts the sources of pressurized fluid and the electrical storage batteries and hydropneumatic storage tanks enabling said carriage to move to the various stations S-MV-B-MP-S in a self-contained manner. When the robot reaches any one of said stations, preferably, it is connected to an electric source properly arranged at said station and which substitutes for said storage batteries on the robot and which properly recharges said batteries through suitable means.

The construction details and the various novelty features of the robot according to the invention will be apparent from the following description.

With reference to the FIGS. 1 to 10, the carriage enabling the robot to move between the various stations will be described in detail. It will be noted in FIGS. 1 and 8 that the carriage 100 has, preferably, a rectangular or square configuration in plan view, that it is made of a metallic structure, and that it rests on the floor through four wheels arranged at the four corners of said carriage, the wheels 1—1' being of the swivel and idle type, and the wheels 2—2' being of the driving and steering type. The wheels 1—1' are shown in detail in FIG. 9. These wheels are, for example, of the twin type and are supported by an arm 3 pivotably supported on a fulcrum 4 which is mounted on a support 5 which is freely rotatable about a vertical shaft 6 with the intermediary of bearings 7 supported on the carriage 100. Elastic suspensions 8 are interposed between the parts 3-5, and a stop member 9 is arranged between the parts 3 and 5 to limit the relative pivotal movement. Scraping members 10 operate on the wheels to keep them cleaned. Both the wheels 1—1' and 2—2' are made of metal and are covered with a suitable synthetic material to avoid damaging the floor whereon the carriage 100 travels.

FIG. 10 shows one the wheels 2—2'. These wheels are supported in cantilever fashion by an inverted L-shaped structure 11 provided at the top thereof with a horizontal bearing 12 the outer race of which is secured to the carriage 100. The structure 11 mounts an angled gearing drive, such as a bevel gearing or a worm gearing, which—through a reduction gearing 13'—is connected to a reversible, variable-speed electric motor 14 provided with a electro-magnetic brake and coupled with a unit 15 comprising a speedometer dynamo and an encoder for communicating with the computer of the plant. The inner race of the bearing 12 has a cup-shaped configuration and protrudes suitably from the carriage 100 so that it can be secured to a sprocket 16 which through a chain 17 is connected to a sprocket 18 of a small motor or geared motor 19 secured to a support 20 which, in turn, is fixed to the carriage 100. An electro-magnetic brake acts on the shaft of either the sprocket 18 or the motor 19, and said shaft is connected to a unit 21 comprising a speedometer dynamo and an encoder for communicating with the electronic processor of the plant. The motor 14 rotates the wheels 2—2' and the motor 19 steers them.

By said motivating means, the carriage 100 may effect any desired movement.

As shown in FIGS. 2 and 3, the carriage 100 effects at least the approaching movements to the winding machines B and presents to them its front side provided with the wheels 2—2', so that this side is parallel to the axis of rotation of said winding machines B. By a reverse movement, the carriage then moves away from these stations. This movement may facilitate the connection and successive disconnection of a connector, for example of the electrical plug type provided on said carriage, with an electrical feeding socket suitably arranged at each operative station. This movement may be used to solve the following problem. One of the problems to be solved in designing the robot of the invention was to ensure a proper and accurate positioning of said robot with respect to the operative stations that required this accuracy, i.e. at least the winding machines B, and to provide a device solving this problem while being technically reliable, of limited dimensions and of relatively simple construction. The problem has been solved as follows. The means designed for co-operation with the winding machines is positioned with an accurate and pre-established orientation and spacing with respect to the carriage 100 which, in turn, when arriving at a winding machine, is aligned exactly thereto both on the horizontal and vertical planes. The latter condition is obtained as follows. At the corner regions of the carriage 100, that accommodate the wheels 2—2', there are secured vertical guides 22 (FIGS. 3-5) the bottom ends of which are open towards the floor and which accommodate with a precision slidable fit a respective rod 23 provided with a head 23' connected to the stem of a jack 24 the body of which is secured to the top of said guides and which usually maintains the rod 23 in a lifted position. The bottom end of said rod is formed with a co-axial conical recess 25. When the stem of the jack 24 is extended, the head of the rod 23 abuts against a step 26 and said stem 23 protrudes to a pre-established extent from the bottom end of its guide 22.

At the corner regions of the carriage 100, that accommodate the swivel wheels 1—1', there are secured, in a vertical position, the bodies of respective jacks 27—27', preferably of the type comprising a stem protruding from both ends of the same body, the lower end of the stem of each jack having secured thereto a foot-member 28 with a rounded base. Usually, the jacks 27—27' keep their stems in a retracted condition wherein each foot-member 28 is received in a recess 29 formed in the carriage 100.

The pairs of stems 23 and foot-members 28 lie on respective imaginary planes which are normal to the carriage 100 and are parallel to each other.

The positions of the rods 23 and stems of the jacks 27—27' are controlled by respective proximity switches 30-31 which are suitably connected to the electronic circuit on the robot.

When the robot approaches a winding machine B, it faces said machine with its side provided with the guides 22, said guides being provided at the top with similar extensions 32 which are also connected, together with said guides, to the carriage 100 by means of stiffening braces 33 and are provided at the top thereof with cylindrical abutments 34 having a suitably convex front side. The axes of said abutments 34 are normal to the axes of the guides 22 and normal to a common imaginary vertical plane which is parallel to said imaginary planes of the rods 23 and foot-members 28.

Figure 6:
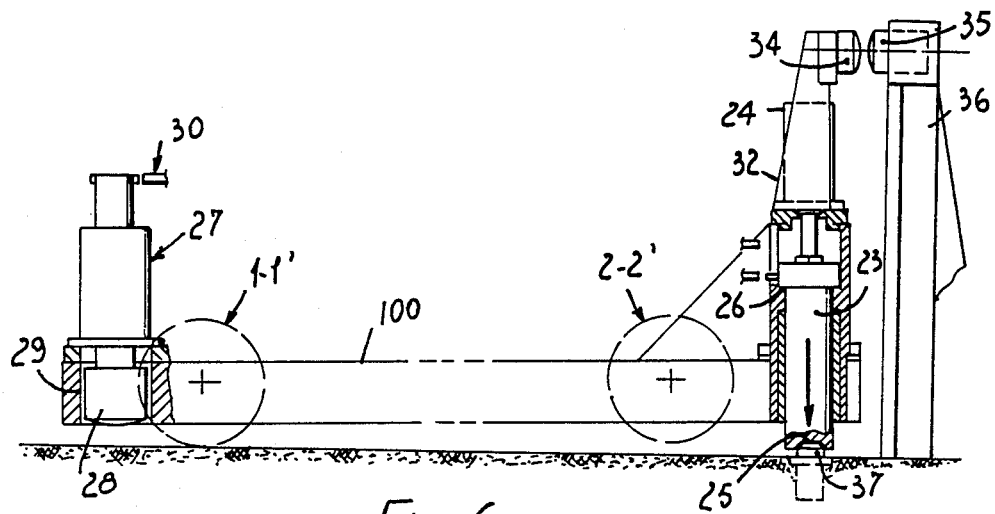
Figure 7:
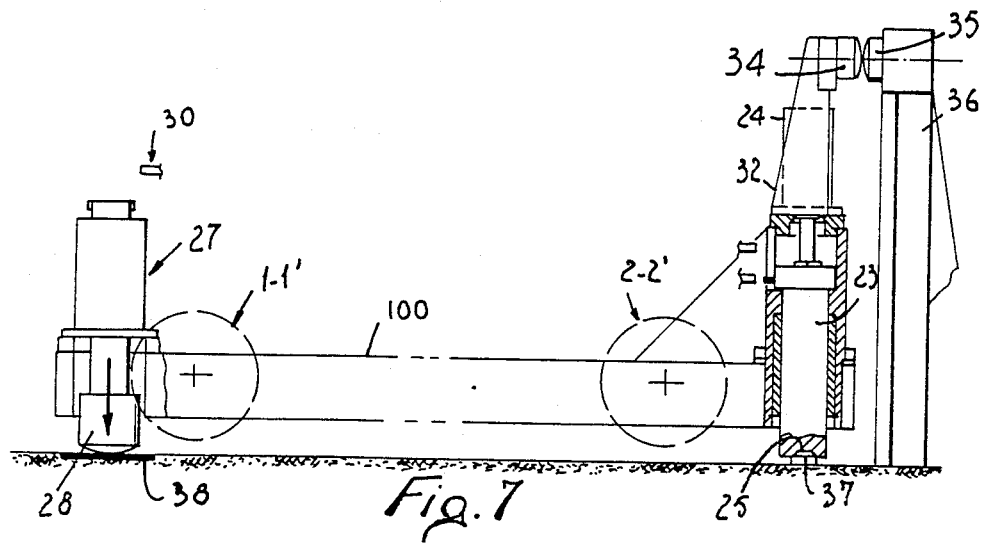
Figure 23:
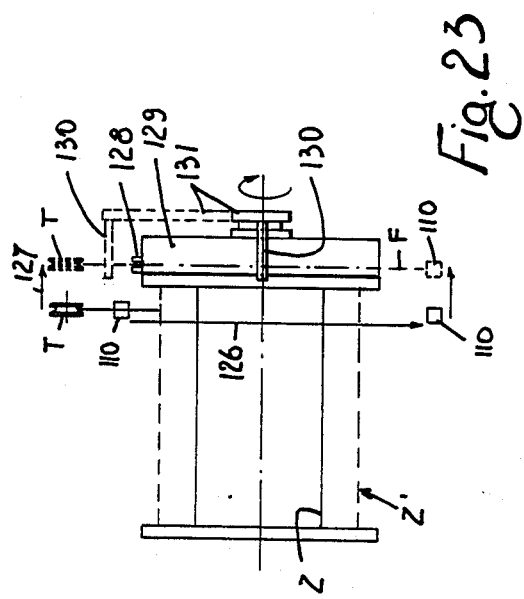
FIGS. 23 and 24 are top plan and side views showing the operational diagram of the assembly of FIG. 16 when the leading end of the wound wire or yarn is to be exposed to the view.

When the robot arrives in front of a winding machine, it stops automatically due to the co-operation of sensors on the carriage 100 with stationary stops on the floor (both not shown on the drawings), while said abutments 34 are opposite to and closely spaced from similar abutments 35 with convex front side which are secured to uprights 36 firmly fixed to the baseplate of said winding machine or to the floor, so that the axes of said abutments 35 are on a same imaginary horizontal plane and are normal to the axis of rotation of the spool being present in said winding machine. It is to be understood that in lieu of said abutments 35 there may be provided suitably machines planer or other suitable stationary stops. At the same time, said rods 23 reach a condition of axial alignment with cones 37 which are either fixed to the floor P so as to protrude therefrom or arranged in suitable perpendicularity or orthogonality conditions with respect to the abutments 35 thereabove. After the carriage 100 has stopped in front of a winding machine, the rods 23 are lowered with a proper timing to their end-of-stroke position, as shown in FIG. 6. The rods 23 are centered on the cones 37 and lift the front side of the carriage 100, as shown in FIG. 6. During this step, the carriage 100 may freely react to said lifting because it rests on the floor with its idle swivel wheels 1—1'.

When the rods 23 have been lowered completely, the foot-members 28 are also lowered to contact the floor or preferably, a reinforced portion 38 of said floor (see FIG. 7) and lift the rear side of the carriage 100 until an accurate engagement and alignment between the abutments 34 and 35 is obtained. Sensors of any suitable type, for example of the pressure switch type and connected to the jacks 27—27', lock and keep the carriage 100 in the condition of FIG. 7, wherein the various means on board said carriage are perfectly aligned both horizontally and vertically and are accurately arranged with respect to the parts to be acted upon by said means (see below).

When the robot has completed its operative cycle with the winding machine, the foot-members 28 will be lifted and thereafter the rods 23 will be lifted as well, and the carriage 100 may then move away from the winding machine just like it had moved thereto and proceeds on its operative cycle.

Figure 1:
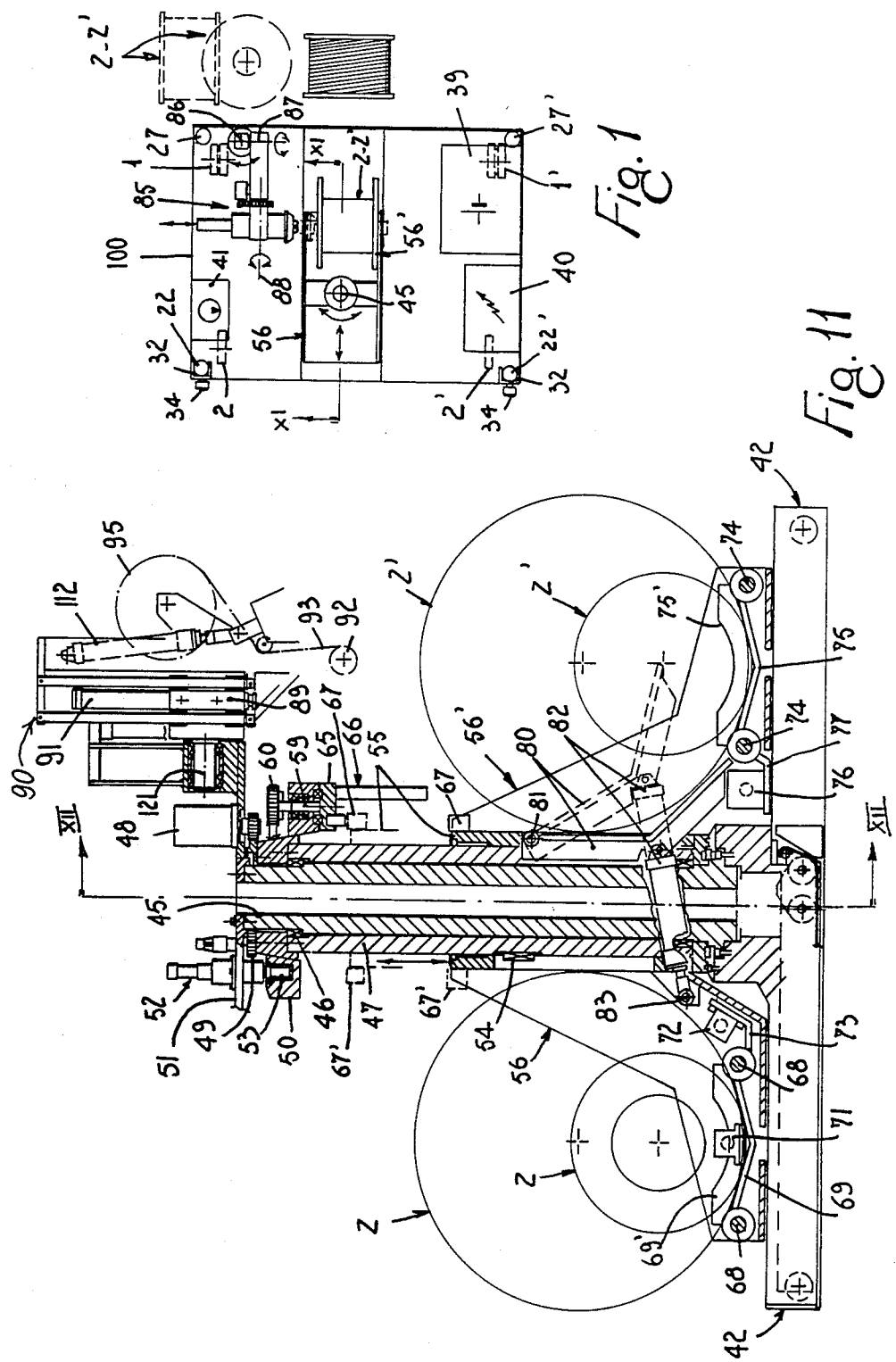
FIG. 1 is a diagrammatic top plan view of the robot according to the invention.

FIGS. 1 and 8 show, by way of example, how the electric accumulator 39, the electric board 40 and the compressor 41 for generating the pressurized fluid with associated hydropneumatic reservoir may be arranged on the carriage 100.

The robot-mounted means for loading and unloading the spools into and from the winding machines B, and for cutting and affixing the wire or yarn, for example, is similar to that described in the Italian patent application No. 12678 A/83 OF Nov. 18, 1983 which corresponds to U.S. Pat. No. 4,610,404 in the name of the same applicant, and said means has been re-examined, improved and adapted to the new condition of a carriage 100 which is at a standstill when in front of a winding machine. In FIGS. 1, 3, 4, 8 and 11 it will be seen that said means comprises a rectilinear horizontal slide 42 which moves on side rollers along rectilinear guides 43 which are fixed intermediately to said carriage 100 normally to the carriage sides at the ends of which there are mounted wheels 1—1' and 2—2' of the same type. The slide 42 is reciprocated by a pair of jacks 44—44' having the same characteristics.

Secured centrally on the slide 42 is a vertical round-section column 45 (see also FIGS. 11-12) having rotatably mounted thereon, by means of bearings 46, a sleeve 47 which may be rotated by a motor 48 the driving pinion of which meshes with a toothed ring 49 which is secured to a flange member 50 fixed to the upper end of said sleeve 47. The motor 48 is, preferably, of the hydraulic type and is mounted on a structure 51 secured to the upper end of said column 45, together with at least one plug member 52 which, under command, co-operates with suitably distributed seats in the underlying flange member 50 to lock the sleeve 47 at the angular position to which it has moved an any time. Suitable sensors (not shown) are provided to control said plug member 52.

The column 45 is axially bored to permit the passage of ducts and/or cables for feeding and/or operating some of the means arranged on the structure 51.

A bushing 55 is axially movable with the intermediary of low-friction bearings, though not rotatable due to the action of a key 54, on the sleeve 47 and carries in cantilever fashion two diametrically opposite brackets or shovels 56—56' that, unlike the robot mentioned above, have a pre-established function and each support a spool at the flanges thereof, in an indirect rather than direct manner (see below).

Figure 12:
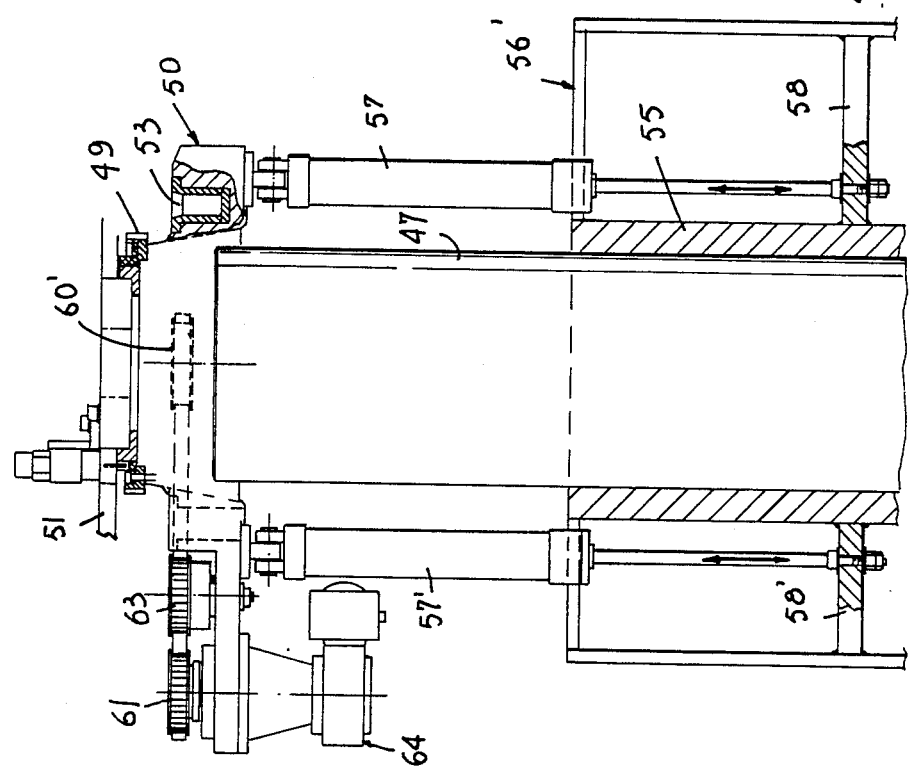
FIG. 12 is an elevational and partly sectional view on the line XII—XII of FIG. 11, showing further constructional details.

With reference to FIG. 12, the numerals 57—57' indicate jacks which are connected with their bodies to the structure 50 and with their stems to transoms 58—58' which connect the brackets 56—56' to each other. By means of these jacks, the assemby of said brackets may be lifted and lowered to adjust said brackets to the level of the lower side of spools of different diameters, particularly when the robot co-operates with the winding machines B.

The positioning at different levels of the brackets 56—56' is effected as follows. It will be noted in FIGS. 11, 12, 13 that the structure 50 mounts, at diametrically opposite positions and with a 90° angular spacing from the jacks 57—57', vertical shafts 59—59' having keyed to their top ends respective pulleys 60—60' which are moved by a pulley 61 through a toothed belt 62 which is kept in a taut condition by an idle pulley 63. All these pulleys are of the toothed type. The pulley 61 is actuated by a small geared motor 64 (FIG. 12). With reference to FIG. 11, it will be noted that the lower ends of the shafts 59—59' have keyed thereto a respective drum 65 to the underside of which there are secured—parallel to said shafts and along a circumference concentric with said shafts—pegs 66 of different heights. As a result of the timed rotation of the shafts 59—59', a pair of pegs 66 of the same height are positioned at any time in front of the sleeve 47 to interfere with shoulders 67—67' fixed to the top of the bushing 55, so as to stop the brackets 56—56' accurately at the level to which said brackets are to be moved at any time to co-operate properly with the winding machine B (see below).

When the robot co-operates with the stations MV and MP, said brackets 56 are usually in their lowest position.

The electro-mechanical programming means mentioned above, being associated with the structure 50 and, therefore, capable of following the rotation of the brackets 56—56' about the vertical axis of the sleeve 47, permits said brackets to remain at the level required at any time during the entire succession of the steps for unloading a filled spool from a winding machine and loading an empty spool thereinto (see below), with considerable reduction of the time required to carry out these steps. Therefore, said means is of great importance as for the operation of the robot of the invention and characterizes said robot with respect to the known solutions.

Figure 14:
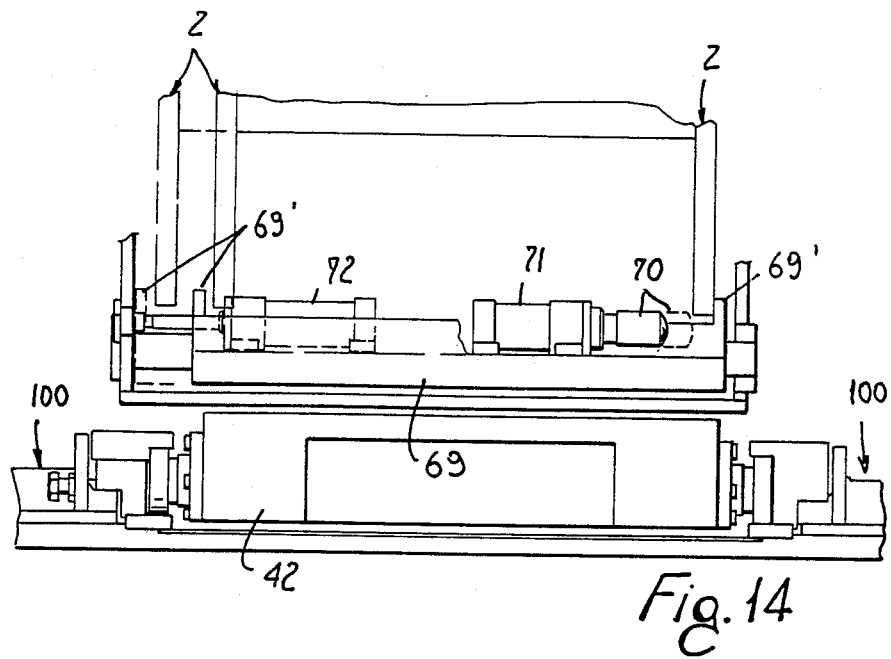

With reference to the FIGS. 11 and 14, the bracket 56 for handling empty spools will be described in detail. The side portions of the brackets 56 support a pair of transverse guides 68 whereon a V-shaped slide 69 with side upright rims 69' may travel, this assembly being sized so as to firmly support a spool Z of any diameter at the flanges thereof. One of said upright rims 69' is acted upon by a pusher member 70 on the stem of a jack 71 which, in turn, is fixed transversely to the intermediate lower region of the slide 69.

Arranged outside of the plan view outline of the slide 69 is a jack 72 the body of which is secured to an extension 73 integral with said slide and the stem of which is connected perpendicularly to one of the side panels of said brackets.

When the robot reaches the magazines MV, it properly indexes the bracket 56 with respect thereto. The stem of the jack 71 (FIG. 14) is retracted and the stem of the jack 72 is extended. The slide 69, therefore, assumes a pre-established proper position with respect to the selected magazine MV. After the spool Z has been positioned on the slide 69, the stem of the jack 71 is extended so that said pusher member 70 will lock the flange of said spool against the adjacent side rim 69' of the slide. As shown in FIG. 14 with broken lines, the spool Z is thus locked on the slide 69 and is disposed suitably for insertion into the winding machine. During this step the stem of the jack 72 will be retracted whereby the spool Z, urged by the side rim 69' against which it is engaged, will be moved axially and its axial bore will be seated on the driving center of the winding machine while the tail center is also advanced thereto. The jack 71 is then neutralized, and the assembly of the brackets 56—56' is lowered and then extracted from the winding machine and the slide 42 is retracted (see also FIG. 8).

Figure 15:
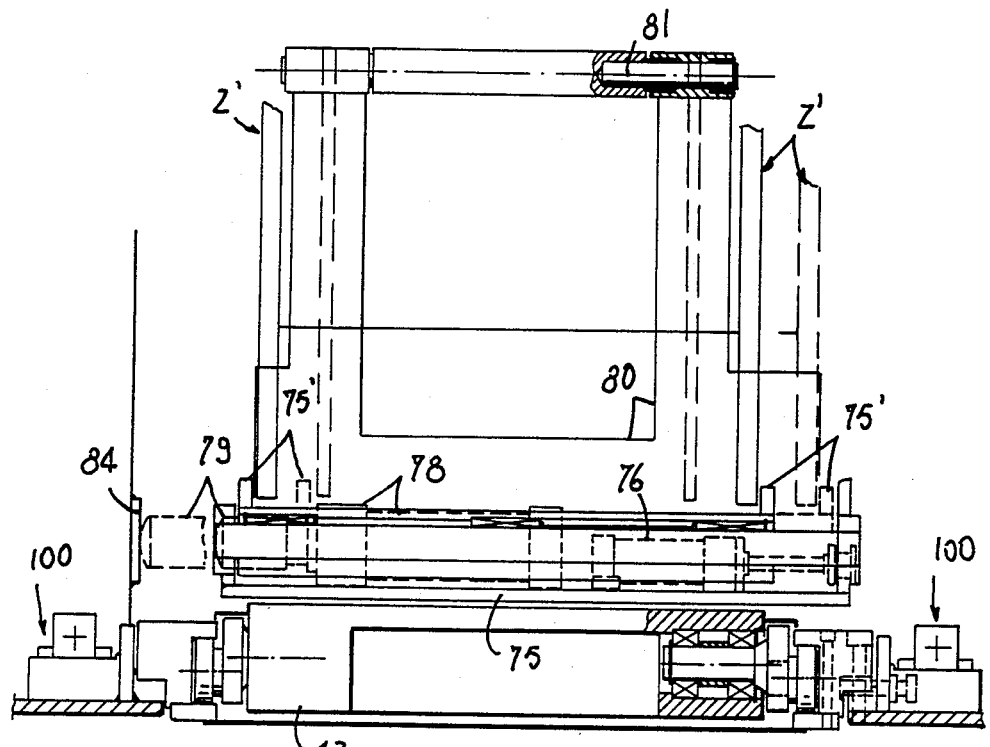
FIGS. 14 and 15 are front elevational and partly sectional views of the brackets for handling the empty and the filled spools.

With reference to the FIGS. 11 and 15, the bracket 56' for handling the filled spools will be dscribed in detail. The side portions of also this bracket 56' support transverse guides 74 whereon a slide 75, similar to the slide 69, may travel and this slide is also moved transversely by a jack 76 which is secured to an extension 77 integral with the slide 75 and comprises a stem connected perpendicularly to a side panel of the bracket 56'.

Mounted on the same extension 77 or on a similar extension is a further jack 78 (FIG. 15), parallel to or axially in line with said jack 76, the stem of which is provided with a pusher member 79 passing through a window in the adjacent side panel of the bracket 56'. The stems of said jacks 78 and 76 are directed oppositely.

The bracket 56' comprises, finally, a "spatula" 80 arranged adjacent said bushing 5 and pivoted at 81 to said bushing, parallel to the guides 74, and connected at the rear end thereof to a pair of jacks 82 which, in turn, are connected at 83 in proximity of "dead areas" of the opposite bracket 56. Usually, said "spatula" is in the position shown in FIG. 11 with solid lines.

The bracket 56' is inserted in an empty and lowered condition into the winding machine B by advancing the slide 42. On completion of the inserting and positioning step and after fixing the tail end of the wound wire or yarn (see below), the assembly of the brackets is lifted to the pre-established level by lifting said bushing 55, with engagement of the shoulders 67—67' against the preselected one of the pegs 66 (FIG. 11). Due to this positioning, the slide 75 of the bracket 56' will be disposed below the filled spool in the winding machine at that moment, substantially contacting the flanges of said spool, and is arranged with respect thereto as shown with solid lines in FIG. 15, in that the stem of the jack is extended.

Following the lifting of the bracket 56', the tail center of the winding machine is neutralized by retracting it axially, whereafter the slide 75 is moved in the same direction as the tail center by the jack 76 which is activated in the retracting direction and by the jack 78 which is activated in the extending direction. The pusher member 79 associated with the latter jack reacts against a machined plane 84 of the winding machine frame.

As a result of the displacement of the slide 75 from the position shown with solid lines to that shown with broken lines in FIG. 15, the spool Z' is displaced axially due to the engagement with a side rim 75' of said slide and is thus extracted from the center of the winding machine. The assembly of the brackets 56—56' is now extracted from the winding machine by moving the slide 42 rearwardly, whereafter said assembly is rotated through 180° on the vertical column 45, whereby the positions of said brackets will be inverted. On completion of this step, the slide 42 approaches again the winding machine to introduce thereinto the bracket 56 with the empty spool Z which will be positioned between the center and tail center of said winding machine, as described above with reference to the operation of the bracket 56 of FIG. 14.

On completion of this step, the assembly of the brackets 56—56' is lowered and then extracted from the winding machine by moving the slide 42 rearwardly, whereafter said robot is returned onto the floor to move away from the winding machine by its wheels.

Then, when the robot arrives at the pre-selected one of the magazines MP, said "spatula" 80 is lifted as shown with broken lines in FIG. 11, so as to interfere with the flanges of said filled spool Z' on the slide 75 and to discharge said spool by rolling it away.

As diagrammatically shown in FIG. 1, the carriage 100 may be equipped with an operating boom 85 (disclosed in U.S. patent application No. 07/141,264 filed Jan. 6, 1988 in the name of the same applicant) which, as an alternative to the gravity transfer of the empty and filled spools between the magazines MV-MP and the brackets 56—56', may be inserted into the axial bore of said spools, clamping them firmly to transfer them between said parts, regardless of the casual or desired orientation of said spools within said magazines MV-MP. Said boom, for example, may be rotated about the vertical axis 86, may be oscilated about a horizontal axis 87 perpendicular to the axis 86, and may be rotated about an axis 88 perpendicular to the axis 87.

With reference to the FIGS. 11 and 16 to 24, we will describe the means arranged on the robot to cut the wire or yarn and fix it to a spool at the end, or, if desired, also at the beginning of the winding operation thereof. It will be noted in FIG. 11 than said means is mounted on the structure 51 and is disposed on the portion of the carriage 100 that is provided with said driving and steering wheels 2—2', so that said means will be introduced into the winding machine B during the spool-changing step, assuming a pre-established and correct orientation and positioning with respect to said spool.

Said means comprises a guide structure 89 which we presently assume as being fixed to the structure 51, and on which a slide 90 may move vertically under the action of a jack 91. The slide 90 is provided at the bottom thereof with an idle roller 92 which is covered with rubber or any other suitable material and the axis of which is parallel to the axis of the spool Z'. In contact with said roller 92 is the non-adhesive face of an adhesive tape 93 passed around an idle roller 94 and unrolled from a reel 95 also supported by said structure 90 (FIG. 16). The adhesive tape is held on the roller 92 by a small pressor roller 96 parallel to said roller 92 and supported in cantilever fashion by a lever 97 which is fulcrumed at 98 to the structure 90 and is connected to a jack 99 which, under command, can move away said pressor roller 96 as shown with solid lines in FIG. 16.

Figure 21:
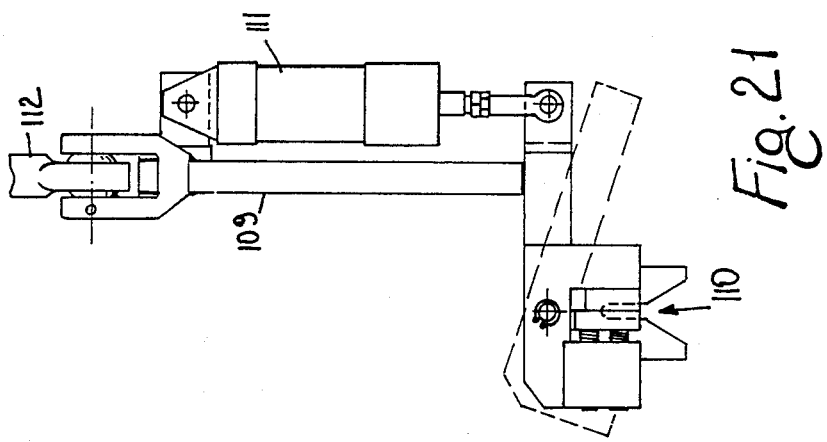
FIG. 21 is a front elevational view of the wire or yarn gripping and cutting unit.
Figure 20:
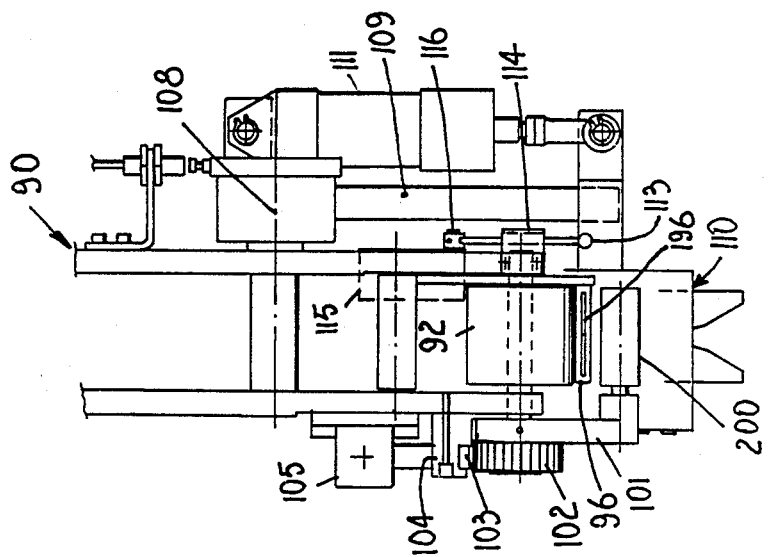
FIG. 20 is a front elevational view of the assembly of FIG. 16.

Arranged parallel to the roller 92 and closely spaced therefrom is a small idle roller 200 of a material which is scarcely adhering to the adhesive face of said tape 93 and which is usually in the rest position shown with solid lines in FIG. 16. The roller 200 is supported in cantilever fashion by a lever 101 (see also FIG. 20) which is radially fixed to one side of a toothed ring 102 which, in turn, is rotatably mounted on an end extension of a shaft of said tape-applying roller 92. Meshing with the gear ring 102 is a rack 103 which is guided by a sliding block 104 secured to one side of the slide 90, together and parallel to a jack 105 which, through an arm 106, supports one end of the rack 103. Following the actuation of the jack 105, the roller 200 rotates about the roller 92 as far as the limit position shown with broken lines in FIG. 16. While moving to this position, the roller 200 travels parallel and closely to the saw-toothed side of a blade 107 which is adjustably secured to the structure 90. On the side of the structure 90 which is opposite to that equipped with said pinion/rack unit, there is fulcrumed at 108, parallel to the tape-applying roller 92, an L-shaped arm 109 carrying the known wire or yarn gripping and cutting unit 110 and having a path of travel about the axis 108 lying on an imaginary plane intercepting perpendicularly and centrally the axis of the roller 92. With reference to FIGS. 16, 20, 21 the numeral 111 indicates the jack which actuates the unit 110 and is connected to the arm 109. The arm 109, in turn, is connected to a jack 112 (FIGS. 11 and 18) which is anchored to the structure 90 and is capable of transferring the unit 110 from the position shown with solid lines to that shown with dot-and-dash lines in FIG. 16, and vice versa.

Arranged on one side of the structure 90 (see FIGS. 20 and 22) is a small lever 113 suitably extending below the tape-applying roller 92 and guided intermediately by a sliding block 114 which is fixed to said structure 90 together with micro-switch 115 the movable equipment 116 of which is connected to said lever.

The devices described above operate as follows. After the robot has entered the winding machine and after the filled spool has been stopped, the structure 90 is commanded to move downwards, this movement stopping automatically when the lever 113 engages the winding of wire or yarn on said spool Z' and when the roller 92 contacts said winding. More particularly, when the micro-switch 115 is actuated, the downwards feeding movement of the jack 91 is switched to low-pressure levels whereby the roller 92 will contact said winding softly and keeps pressing it with a suitable pressure. At due time, the pressor roller 96 is moved away from the roller 92 and the unit 110, which is in the solid line position, is activated to cut the tail end of the wire or yarn wound on the spool Z' and to hold the leading end of the wire or yarn from the traversing device of the winding machine. The spool Z' is now rotated counterclockwise (as seen in FIG. 16), whereby the adhesive tape 93 from the roller 92 will adhere to the winding to stick thereto the trailing end of the wire or yarn, i.e. the end which will constitute the leading end upon unwinding said wire or yarn. After a partial rotation, the spool Z' is automatically stopped, the structure 90 is lifted to a suitable extent (see below), whereafter the roller 200 is transferred to the position shown with broken lines in FIG. 16, so as to bring the adhesive tape 93 to interfere with the blade 107 and to be cut thereby. On completion of the active stroke of the roller 200, the pressor roller 96 is lowered for holding the tape against the roller 94, whereafter the roller 200 is returned to its rest position.

The structure 90 remains in the upper position mentioned above while the filled spool Z' is discharged from the winding machine and is replaced with an empty spool Z. Before inserting the new spool, the unit 110 is moved to the position shown in FIG. 16 with dot-and-dash lines, so that the wire or yarn F will be disposed under the roller 92, whereby when the empty spool Z has been inserted into the winding machine and the structure 90 is lowered, the tape-applying roller 92 will press the wire or yarn onto the core of said spool and will substitute for the function of the unti 110 which at due time is neutralized. Thereafter, when the pressor roller 96 has been moved away, the spool Z is rotated and the leading end of the wire or yarn is affixed thereto, by substantially repeating the cycle described above in connection with the affixing of the leading end of the wire or yarn to the filled spool, the only difference being that the structure 90 is finally lifted up and returned to its rest position. The unit 110 will also be returned at due time to its rest position. It is to be noted that during the neutralization of the pressor roller 96, if the leading end of the adhesive tape 93 tends to remain sticked thereto, this union is eliminated by a small lanceolate blade 196 which is provided longitudinally on said pressor roller (FIG. 16).

Figure 17:
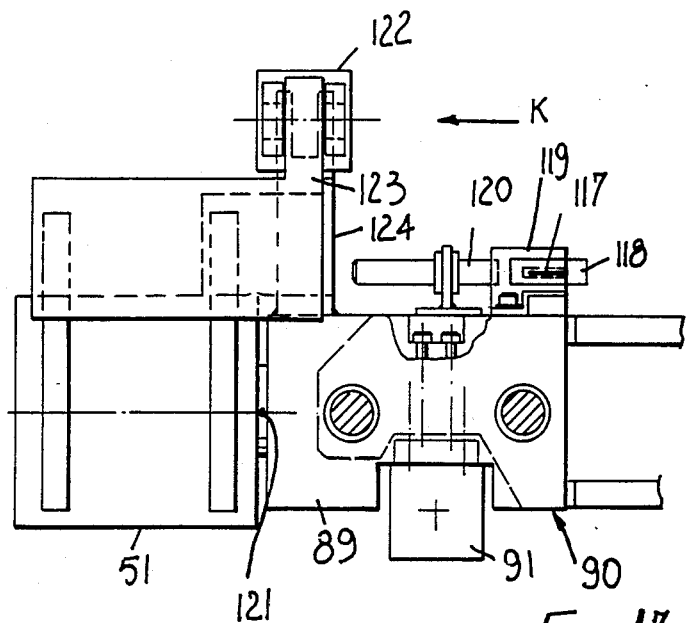
FIG. 17 is a top plan and partly sectional view of the assembly of FIG. 16.
Figure 19:
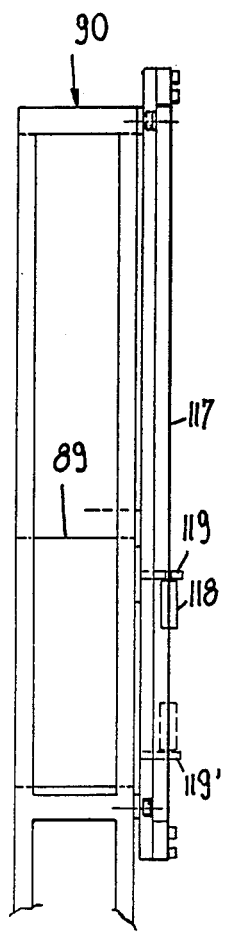
FIG. 19 shows further constructional details of the assembly of FIG. 17, as seen in the direction of the arrow K.
Figure 18:
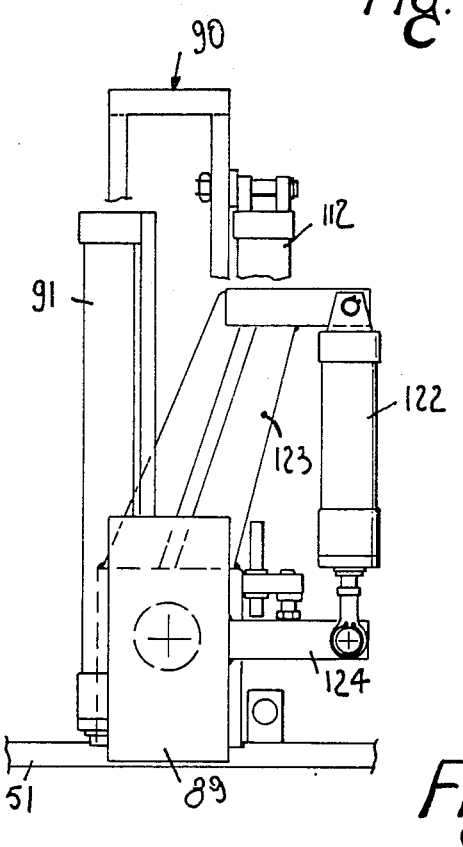
FIG. 18 shows some details of the assembly of FIG. 17, as seen in the direction of the arrow K.
Figure 22:
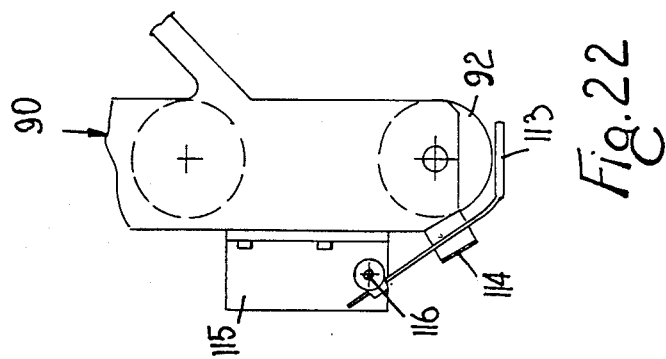
FIG. 22 is a side view of a sensor to limit the downward stroke, associated with the assembly of FIG. 16.

In order to effect the partial lifting of the structure 90 after each application of adhesive tape on either an empty and a filled spool, and in order to obtain the same lifting extent regardless of any variation of the diameter of the spools, the known means illustrated in the FIGS. 17 and 19 is used; it comprises a steel strip 117 secured along the length of the structure 90 and frictionally mounting a sliding block 118 the stroke of which is limited by adjustable stops 119-119' mounted on the guide structure 89 in proximity of sensors 120.

Figure 24:
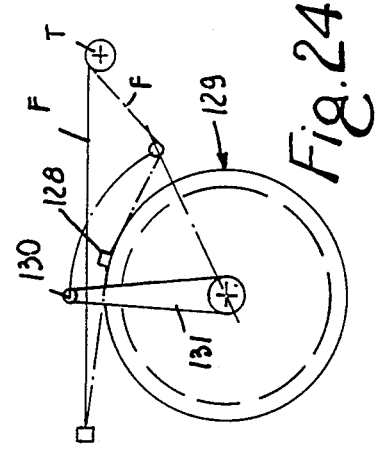

The means illustrated in the FIGS. 11, 16 to 22 are adapted as well for fixing the leading end of the wire or yarn to a spool, so that the former will protrude from the entire winding on the spool and may be reached in case of continuous feeding of the wire or yarn. For this purpose, the winding machine should be suitably equipped, as described below by way of example, while in the means being illustrated the following provisions are used. In FIG. 11 it will be noted that the structure 89 is mounted on the structure 51 so as to be oscillatable about a horizontal axis 121 which is normal to the axis of rotation of the winding machine and by means of a jack 122 (FIGS. 17-18)—whose body is anchored to an extension 123 secured to 51 and whose stem is anchored to an arm 124 secured to said structure 89—the latter structure and the associated guide 90 may be positioned vertically or they may be oscillated on said axis 121 for the purpose now to be described with reference to FIGS. 23 and 24. It will be noted in FIG. 23 that upon fixing the trailing end of the wire or yarn to the spool Z', the traversing device T of the winding machine is in the position shown with solid lines, and the unit 110 for gripping and cutting the wire or yarn is close to and in line with said device. After a filled spool has been discharged, the unit 110 moves away from the traversing device T as shown by the arrow 126, and then moves laterally together with said device T, as shown with broken lines and as indicated by the arrows 127. During this step, the structure 89 oscillates about said axis 121. The length of wire or yarn F running between the parts T and 110 is positioned above a clamp 128 which is open and disposed on a counter-flange 129 which is co-axial with the center of the winding machine and rotating solidarily therewith. Said wire or yarn is disposed below a peg 130 which is parallel to the axis of rotation of the winding machine and is supported by an arm 131 which, in turn, may be rotated about the axis of the winding machine by its own means independent from the means for rotating the spool. Before an empty spool is introduced into the winding machine, the peg 130 is rotated counterclockwise as seen in FIG. 24, whereby the wire or yarn F will follow the path of travel shown with dot-and-dash lines and enters the clamp 128. When an empty spool Z is introduced into the winding machine, the flange of said spool that is adjacent the counter-flange 129 will cause the mechanical closing of the clamp 128, which will grip the wire F. The peg 130 then returns to its rest position, and the means of FIG. 16 also returns to its vertical upper rest position, whereafter the traversing device T is returned to its wire-guiding function between the flanges of the spool Z to proceed on its normal operating cycle. When the winding step is over, and the filled spool is discharged from the winding machine, the clamp 128 opens and releases the leading end of the wound wire or yarn, i.e. the trailing end of the wire or yarn in the unwinding step, which may be connected to the leading end of the wire or yarn of a similar spool when said wire or yarn is to be fed continuously. It is to be understood that conventional means other than described above may be used to form a trailing end of the wire or yarn even longer than that obtained with said means.

The main novelty features of the means of the FIGS. 11 and 16 to 24 may be summarized as follows. A novel and important feature is the presence of the pressor roller 96 with its blade 196, which ensures the adhesion of the adhesive tape to the tape-applying roller 92. Another novel and important feature is, finally, the possibility of the assembly of said means to oscillate about the axis 121 to permit the affixing of the leading end of the wire or yarn to be wound, either to the core of a spool or to an external portion of said spool if said leading end is to be exposed to the view and accessible on completion of the winding step.

It is to be understood that in the description we have omitted all constructional details concerning the electric and electronic circuits and pressurized fluid circuits, in that they may be readily perceived and constructed by those skilled in the art.

I claim:

1. A programmable robot for automatically loading and unloading spools relative to a winding machine, a spool-supplying magazine and a spool-collecting magazine comprising:

a means for handling the spools;

a cutting means for cutting and temporarily gripping a wire or yarn after a spool has been filled in the winding machine;

a fixing means for fixing to the filled spool a cut trailing end of the wound wire or yarn and for fixing to an empty spool a cut leading end of the wire or yarn;

an automatically guided carriage equipped with
 (a) a pair of front driving and steering wheels,
 (b) a pair of rear idle and swivel wheels,
 (c) a front side at which said pair of front wheels are provided which said front side is presented to the winding machine parallel to a winding axis of the machine,
 (d) a rear side opposite said front side;

two abutments supported equidistantly above said carriage by supports secured to said carriage, said abutments having convex end portions which project outwardly from a vertical plane containing said front side;

two vertical telescopic front foot-members provided on said carriage in registry with said supports and provided with respective associated front jacks which lower a respective end portion of said front foot-member below an adjacent said front wheel, said front foot-members being disposed with an axis of movement parallel to the vertical plane;

two vertical telescopic rear foot-members provided on said rear side of said carriage and provided with further respective associated rear jacks which lower a respective end portion of said rear foot-member below an adjacent said rear wheel, said rear foot-members being disposed with an axis of movement parallel to the vertical plane;

an actuating means for maintaining said front and rear jacks in the position where said front foot-members and said rear foot-members are lowered and for signalling to a control mechanism when said front foot-members and said rear foot-members are lowered;

said end portions of said front foot-members having an aligning means for engaging and aligning with a respective cooperating portion anchored in front of the winding machine such that when the robot reaches an end of an approach to the winding machine said front abutments will be closely spaced to and opposite cooperating abutments associated with the winding machine and thereafter said front foot-members are lowered by said front jacks a same extent causing said aligning means on said end portions to engage and align on the respective cooperating portions followed by a same extent lowering of said rear foot-members causing a lifting of said rear side and a corresponding movement of said abutments into contact with said cooperating abutments as well as actuation of said control means to maintain said carriage held in place with said foot-members in horizontal and vertical alignment with respect to the winding machine so that various operations are performed with said control means in sequence.

2. A robot according to claim 1 wherein said means for handling the spools includes:
   a slide which is movably mounted on said carriage between said front side and said rear side;
   an operating part rotatably mounted on said slide;
   a first axial displacement means mounted on said operating part for effecting an axial displacement of a filled spool off of the winding machine and for holding the filled spool; and
   a second axial displacement means mounted on said operating part opposite from said first axial displacement means for holding an empty spool and for effecting an axial displacement of the empty spool to the winding machine;
   whereby by rotation of said operating part and movement of said slide a filled spool is removed from the winding machine and an empty spool delivered to the winding machine without movement of said carriage.

3. A robot according to claim 1 wherein said means for handling the spools includes:
   a filled spool bracket having sides which is positioned in the winding machine, said filled spool bracket including (a) a first slide of concave configuration having a first end upright rim upon which said first slide a filled spool rests by gravity and (b) a first jack means for moving said first slide from one side to the other of said filled spool bracket such that said first end upright rim bears against a flange of the filled spool in the winding machine as said first slide is moved to pull the filled spool from the winding machine onto said first slide; and
   an empty spool bracket having sides which is subsequently positioned in the winding machine, said empty spool bracket including (a) a second slide of concave configuration having a second end upright rim upon which said second slide an empty spool rests by gravity and (b) a second means for moving said second slide from one side to the other of said empty spool bracket such that said second end upright rim bears against a flange of the empty spool in the winding machine as said second slide is moved to push the empty spool from said second slide onto the winding machine.

4. A robot according to claim 3 wherein said second slide has mounted thereon a locking jack with a movable lock stem which said locking jack is disposed transversely and intermediate said second slide such that by extension of said stem from said jack toward said second end upright rim a flange of an empty spool is pressed and thus locked against said second upright rim.

5. A robot according to claim 3 wherein said first slide has mounted thereon a pushing jack having a movable push stem which said movable jack is disposed such that said push stem is perpendicular to said first end upright rim which is provided with a window opposite said push stem such that when the filled spool is extracted from the winding machine said pushing jack is actuated to move said push stem through said window and into pushing engagement with a frame portion of the winding machine to assist in unloading the filled spool from the winding machine.

6. A robot according to claim 3 wherein said means for handling spools includes:
   a column extending upwards from said carriage;
   a sleeve mounted for rotational movement about said column;
   a bushing mounted for vertical movement on said sleeve and including a pair of shoulders affixed at a top end thereof, said bushing supporting said filled spool bracket end said empty spool bracket;
   a lifting means for lifting and lowering said bushing and hence said brackets relative to said sleeve;
   a rotating means for rotating said sleeve and hence said bushing and brackets about said column;
   a stop means for stopping the upward movement of said bushing at preselected heights, said stop means including
      (a) a structure provided at a top of said sleeve,
      (b) a pair of drums mounted for rotation to said structure,
      (c) a motor means for rotating said drums a same amount,
      (d) respective sets of different length pegs depending from each drum positioned such that pegs of a same length for each drum vertically align with a corresponding said shoulder of said bushing;
   whereby when the carriage is anchored in front of the winding machine with the bushing in a lowered position in order to unload and load spools from the winding machine, said motor means rotates said drum to position preselected same length said pegs in alignment with said shoulders such that said bushing is then raised from the initial lowered position by said lifting means until said shoulders engage corresponding said pegs and said brackets are thereby at a proper height to unload a filled spool, be rotated to exchange positions by said rotating means, and load an empty spool.

7. A robot according to claim 1 wherein said fixing means includes:
   a structure located above said carriage to which said cutting means and said fixing means is mounted,
   an adhesive tape dispensing means for applying a portion of adhesive tape over the trailing edge of the wire or yarn and filled spool located therebeneath and selectively for applying a portion of adhesive tape to the leading edge of the wire or yarn and a core of the empty spool located therebeneath,
   a mounting means for mounting said structure for oscillation about a horizontal axis perpendicular to a vertical plane containing an axis of rotation of the spool in the winding machine, and
   an actuating jack for selectively oscillating said structure about said mounting means,
   whereby the trailing edge of the wire or yarn is selectively attached to the core of the empty spool by said adhesive tape dispensing means or to a clamp carried by a counter-flange associated with a driving center pin of the winding machine by oscillation of said structure by said actuating jack together with a similar displacement of the transversing device of the winding machine and a rotation of a peg around the counter-flange so that the trailing edge remains fixed to the counter-flange and subsequently protrudes from the winding so as to be accessible for a continuous-feeding operation.

8. A robot according to claim 7 wherein said adhesive tape dispensing means includes:
   a tape applying roller along a portion of which the portion of the adhesive tape engages with a non-adhesive side, an oscillatable pressor which in a first position presses the portion of the adhesive tape against the tape applying roller and which in a second position is displaced away from the tape applying roller, a moving means for selectively moving said oscillatable pressor, and a lanceolate blade provided trnsversely adjacent said oscillatable pressor which assures detachment of the portion of the adhesive tape from said oscillatable pressor as said oscillatable pressor is moved from the first position to the second position.

9. A robot according to claim 1 wherein said means for handling the spools includes:

a pair of brackets, and a boom means mounted on said carriage for loading and unloading the spools onto and from said brackets and for withdrawing and discharging the spools from and into the respective supplying magazine and collecting magazine regardless of orientation of the spools.

* * * * *